(12) United States Patent
Ng

(10) Patent No.: US 7,688,041 B2
(45) Date of Patent: Mar. 30, 2010

(54) METHOD AND APPARATUS FOR ACTIVE POWER FACTOR CORRECTION

(76) Inventor: ShekWai Ng, 2/F, Dah Sing Life Bldg, 99 Des Voeux Rd., Central, Hong Kong SAR (CN)

( * ) Notice: Subject to any disclaimer, the term of this patent is extended or adjusted under 35 U.S.C. 154(b) by 190 days.

(21) Appl. No.: 12/041,642

(22) Filed: Mar. 3, 2008

(65) Prior Publication Data

US 2008/0211462 A1 Sep. 4, 2008

Related U.S. Application Data

(60) Provisional application No. 60/892,865, filed on Mar. 4, 2007.

(51) Int. Cl.
*G05F 5/00* (2006.01)
*H02M 5/42* (2006.01)

(52) U.S. Cl. .......................... 323/207; 363/84
(58) Field of Classification Search ................ 323/207; 363/21.05, 21.07, 21.13, 84
See application file for complete search history.

(56) References Cited

U.S. PATENT DOCUMENTS

| 5,757,635 | A | * | 5/1998 | Seong | 363/89 |
| 5,867,379 | A | * | 2/1999 | Maksimovic et al. | 363/89 |
| 6,191,565 | B1 | * | 2/2001 | Lee et al. | 323/222 |
| 7,489,529 | B2 | * | 2/2009 | Yang | 363/40 |
| 2006/0132104 | A1 | * | 6/2006 | Li | 323/207 |

* cited by examiner

*Primary Examiner*—Mark A Robinson
*Assistant Examiner*—Jeffrey Gblende

(57) ABSTRACT

A power factor correction method and apparatus which use Pulse Frequency Modulation (PFM) to control an AC/DC converter is disclosed. The average current drawn by the AC/DC converter is compared with a reference sinusoidal signal and the error is used to determine the switching frequency. The switching frequency varies with the sinusoidal reference signal such that the converter emulates a resistive load. By using PFM control, EMI is spread over a range rather than concentrated at a few frequencies. Since the switching frequency decreases with the loading of the converter, the switching loss decreases with the loading as well. Thus, the need of meeting efficiency standards, e.g. the 80 PLUS and Energy Star, can be fulfill without extra circuitry.

6 Claims, 6 Drawing Sheets

METHOD AND APPARATUS FOR ACTIVE POWER FACTOR CORRECTION

FIELD OF INVENTION

The present invention relates to the field of switching mode power supplies. More particularly, the present invention relates to a method and apparatus which controls the operation of a AC/DC converter using pulse frequency modulation to achieve high power factor and low standby power at light loading

BACKGROUND OF INVENTION

There is a need for all power supplies connected to the mains to meet the harmonic limits of the European standard EN-61000-3-2 or similar in other countries. There are further needs to meet efficiency standards, e.g. 80 PLUS and Energy Star, in future. Prior arts which can meet the EN-61000-3-2 requirements can be divided into two categories.

The first category (U.S. Pat. No. 4,437,146, U.S. Pat. No. 5,134,355, U.S. Pat. No. 5,654,880, U.S. Pat. No. 6,900,623, US2006/0158912) senses the rectified AC voltage and controls the operation of the converter using a feedback loop such that the current drawn by the converter follow the rectified AC voltage. This category suffers from the problem of feedback loop stability when the AC line voltage varies over a wide range, e.g. from 115AV to 240VAC. They use complicated compensation network to ensure stability and is susceptible to noise and distortion in the rectified AC voltage. For example, the prior art U.S. Pat. No. 6,900,623 senses the RMS value of the AC line voltage and scales the loop gain accordingly.

The second category (U.S. Pat. No. 5,867,379, U.S. Pat. No. 5,742,151) uses a nonlinear carrier signal without sensing the rectified AC voltage to generate the same control signal as in the first category. This category suffers from the problem that it works best when the switching mode converter operates in the continuous mode. When the loading of the converter is only a fraction of the full load, the converter may go into discontinuous mode and the power factor of the converter can no longer be maintained at or near unity. On the other hand, the first category is free from this problem.

Both categories use Pulse Width Modulation (PWM) to control the switch inside the converter and suffer from the problem of concentrated EMI. There are studies in prior art on the merit of using Pulse Frequency Modulation (PFM) or Frequency Modulation (FM) instead of PWM control to alleviate the EMI problem such that a smaller and cheaper EMI filter can be used instead. However, these prior arts use a dedicated unit to adjust the switching frequency while the pulse width is controlled by another unit and the complexity of the design becomes double.

Lastly, in order to meet efficiency standards, e.g. the 80 PLUS and Energy Star, extra circuitry is needed to override the normal control of these power factor controllers and reduce the power consumption at light loading. This implies extra circuitry and more complex control to ensure the controllers transit smoothly between the light loading mode and normal loading mode.

The PFM approach is a well known solution to provide smooth transition between the light loading mode and normal loading mode. However, conventional single-stage AC/DC converters which do not has a Power Factor Correction front stage will suffer from the problem of larger output ripple at medium load. However, this is not a concern for two-stage AC/DC converter which has a Power Factor Corrector as the front stage and a DC/DC converter as the second stage.

Thus, there is a need to combine the functions of power factor correction and PFM into a single controller to overcome all problems in the prior arts.

SUMMARY OF INVENTION

Accordingly, an object of the present invention is to provide a power factor control apparatus which control an AC/DC converter.

Another object of the present invention is to provide a power factor control apparatus which can improve the EMI performance of the AC/DC converter.

Another object of the present invention is to provide a power factor control apparatus which has low power consumption under light loading.

Another object of the present invention is to provide a power factor control apparatus which is applicable to converters operating in continuous conduction mode as well as discontinuous conduction mode.

A new kind of power factor corrector is invented. A sinusoidal reference signal is compared with a sensed current from the converter under control. The difference is fed to a low pass filter and the output is compared with a ramp signal. The output of the comparator is used to control the frequency of a pulse generator. The output pulses of the generator control a switch inside the converter under control.

A main innovation feature of the present invention is the use of Pulse Frequency Modulation to control the AC/DC converter. The pulse width of the pulse generator output is fixed and the pulse frequency is adjusted accordingly to achieve a high power factor.

An advantage of the present invention is that the conducted EMI is improved over the prior arts.

Another advantage is that the present invention has a low pass filter in its inner current control loop such that harmonics and noise in the rectified AC voltage has little effect on its performance.

Another advantage of the present invention is the switching loss of the AC/DC converter falls with the loading because the switching frequency decreases with the loading.

Thus the present invention has a number of improvements over the prior arts. These and other objects and advantages of the present invention will become clear to those skilled in the art in view of the description of the best presently known mode of carrying out the invention and the industrial applicability of the preferred embodiment as described herein and as illustrated in the several figures of the drawings.

DETAIL DESCRIPTION OF THE PREFERRED EMBODIMENT

The invention will now be described by the following embodiments. These embodiments are not intended to limit the scope of the present invention but are to demonstrate the invention only. All features and combinations described in the embodiments are not necessarily essential to the invention.

The preferred embodiments of the present invention and their advantages are best understood by referring to FIGS. 1-6b of the drawings. Like numerals are used for like and corresponding parts of the various drawings.

Figure 1:
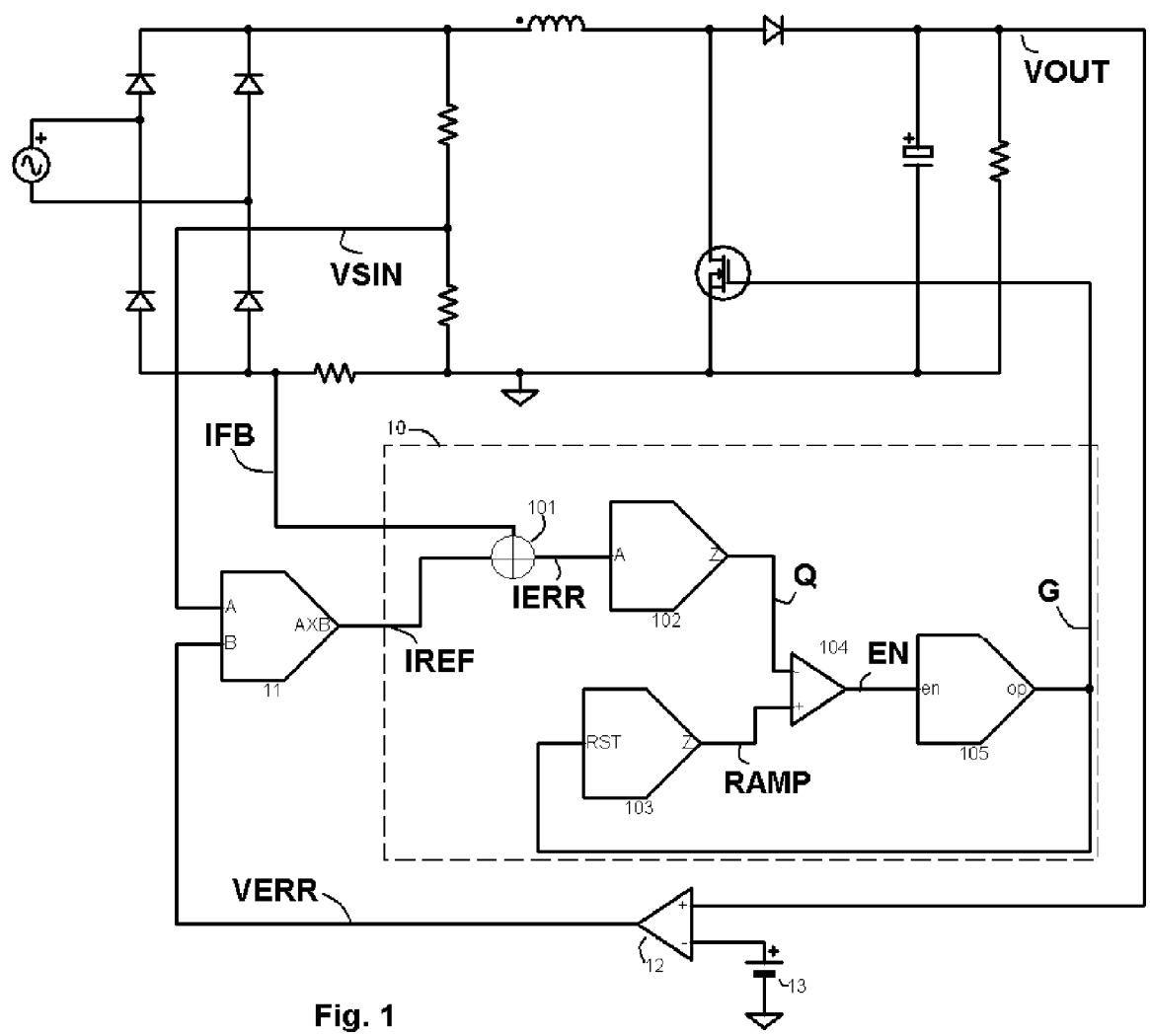
FIG. 1 illustrates an embodiment of the present invention when the AC/DC converter is a boost converter.

FIG. 1 illustrates an embodiment of the present invention when the AC/DC converter is a boost converter. The power factor correction apparatus 10 comprises a summer 101, a averaging filter 102, a ramp signal generator 103, a comparator 104, and a pulse generator 105. A comparator 12 generates a error signal VERR and then a multiplier 11 generates a sinusoidal current signal IREF for the apparatus. The level is set by the error signal VERR. However, one may use other means, e.g. US2006/0158912, to generate the current reference signal.

The apparatus inputs a current reference signal IREF, a signal IFB which is a scaled version of the current drawn by the boost converter, and outputs a control signal G to control the switch of the boost converter.

The summer 101 compares the reference current signal IREF with the signal IFB and outputs a signal IERR. The averaging circuit 102 attenuates the high frequency components in the signal IERR and outputs a signal Q. This signal Q determines the pulse frequency of the control signal G. After every fixed width pulse from the pulse generator 105, the signal RAMP from the ramp generator 103 starts ramp up. While the ramp signal is below the Q signal, the output signal EN of the comparator 104 remains low and the pulse generator is held in pulse off mode. When this ramp signal is higher than the Q signal, the pulse generator 105 is reactivated and generates another pulse again. The pulse generator 105 has a minimum pulse off time, i.e. a minimum oscillation period and a maximum duty cycle. When the ramp signal is above the Q signal before the minimum period expires, the pulse generator remains in pulse off mode until the minimum period expired. When the pulse generator 105 is re-activated, the ramp signal generator will be reset and begin a new cycle after the fixed width pulse.

Figure 2:
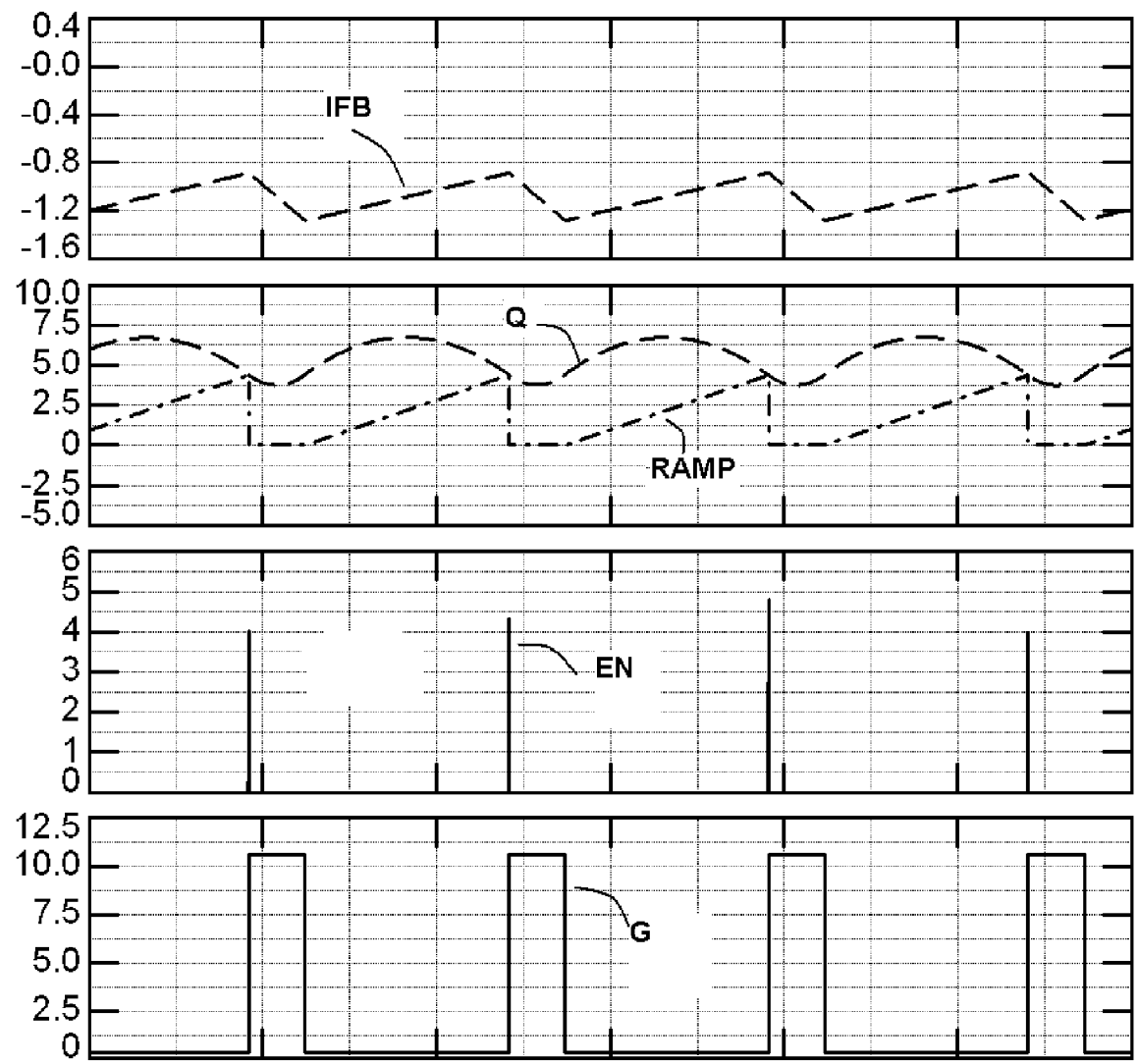
FIG. 2 illustrates the operation of the power factor correction apparatus by showing the simulated waveforms at different nodes of the exemplary boost converter in FIG. 1 according to the present invention.

FIG. 2 illustrates the relationship between the signals Q, RAMP, EN and G.

Figure 3:
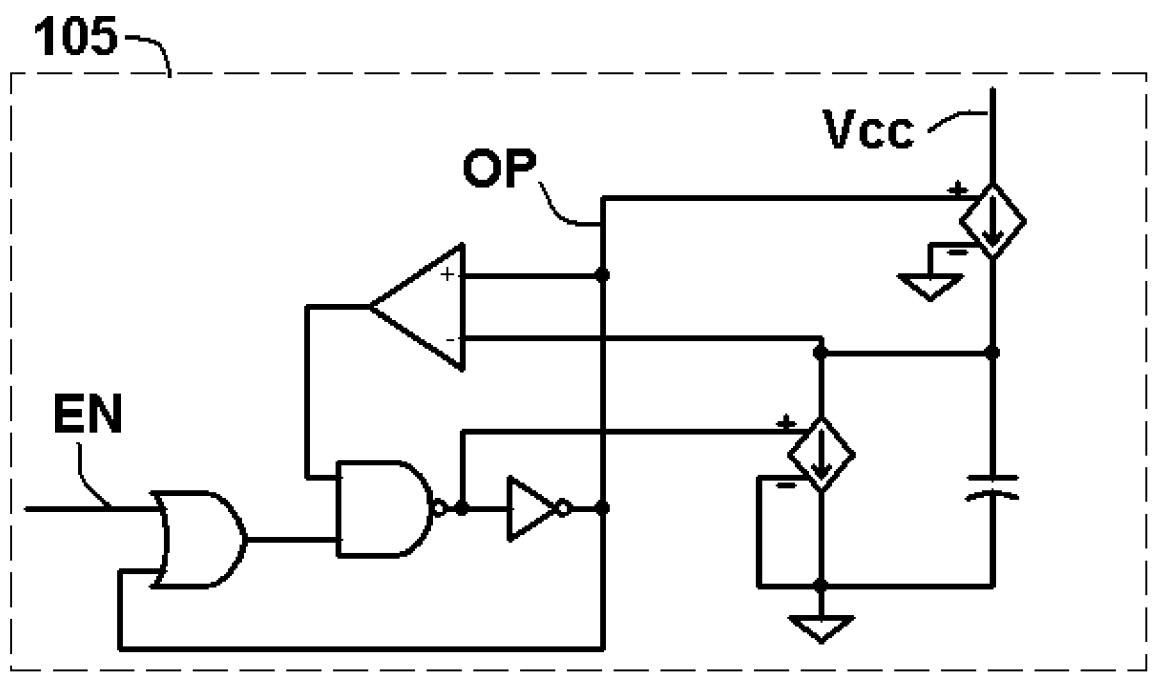
FIG. 3 illustrates an embodiment of a pulse generator whose pulse off time is extensible by a input signal according to the present invention.

FIG. 3 illustrates an embodiment of the pulse generator 105. The output of the pulse generator 105 has a fixed pulse width and a minimum pulse off time, i.e. a minimum oscillation period and a maximum duty cycle. The pulse generator starts generate a fixed width pulse when the signal EN rises from low to high. Then it will be turned off for a minimum interval. The pulse off interval can be extended by holding EN low. When EN is still high after the minimum pulse off interval, the pulse generator 105 will begin a cycle with a new pulse G.

The average current drawn by the boost converter will always be larger than the reference current in the present invention. This excess value is represented by the signal Q. When the voltage error VERR increases, the reference sinusoidal signal IREF will increase and the signal Q will decrease and the pulse off interval will become shorter to increase the effective duty cycle and thus the current drawn by the boost converter and to increase the output voltage to reduce the error.

In this embodiment, the multiplier can be replaced by a sinusoidal pulse generator synchronized to the VSIN as in the prior art US2006/0158912.

Figure 4:
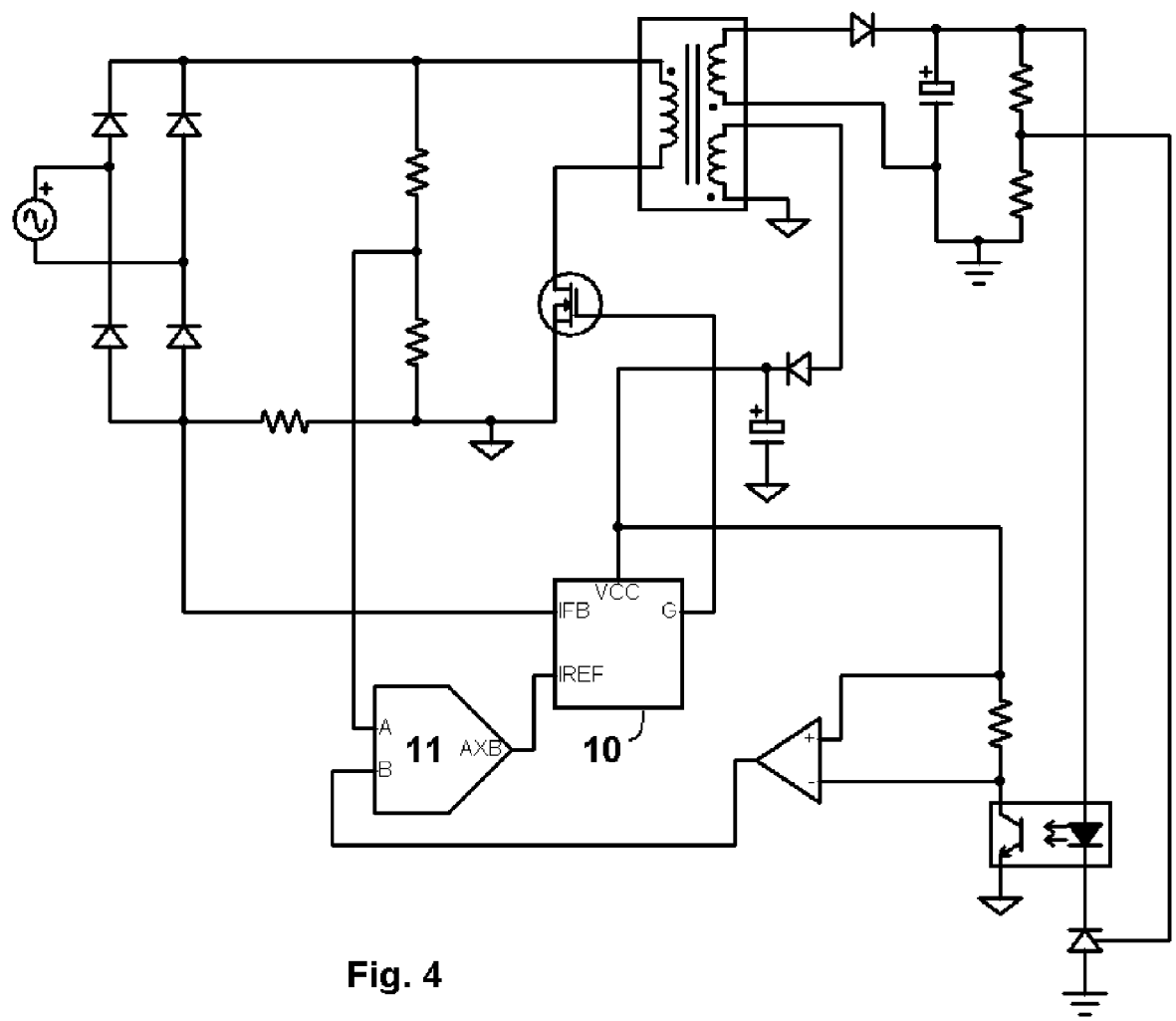
FIG. 4 illustrates an embodiment of the present invention when the AC/DC converter is a Flyback converter.

FIG. 4 illustrates an embodiment of the present invention when the AC/DC converter is a Flyback converter. One may see that the application of the present invention to a Flyback converter is simple and obvious to those skilled in the art.

Figure 5:
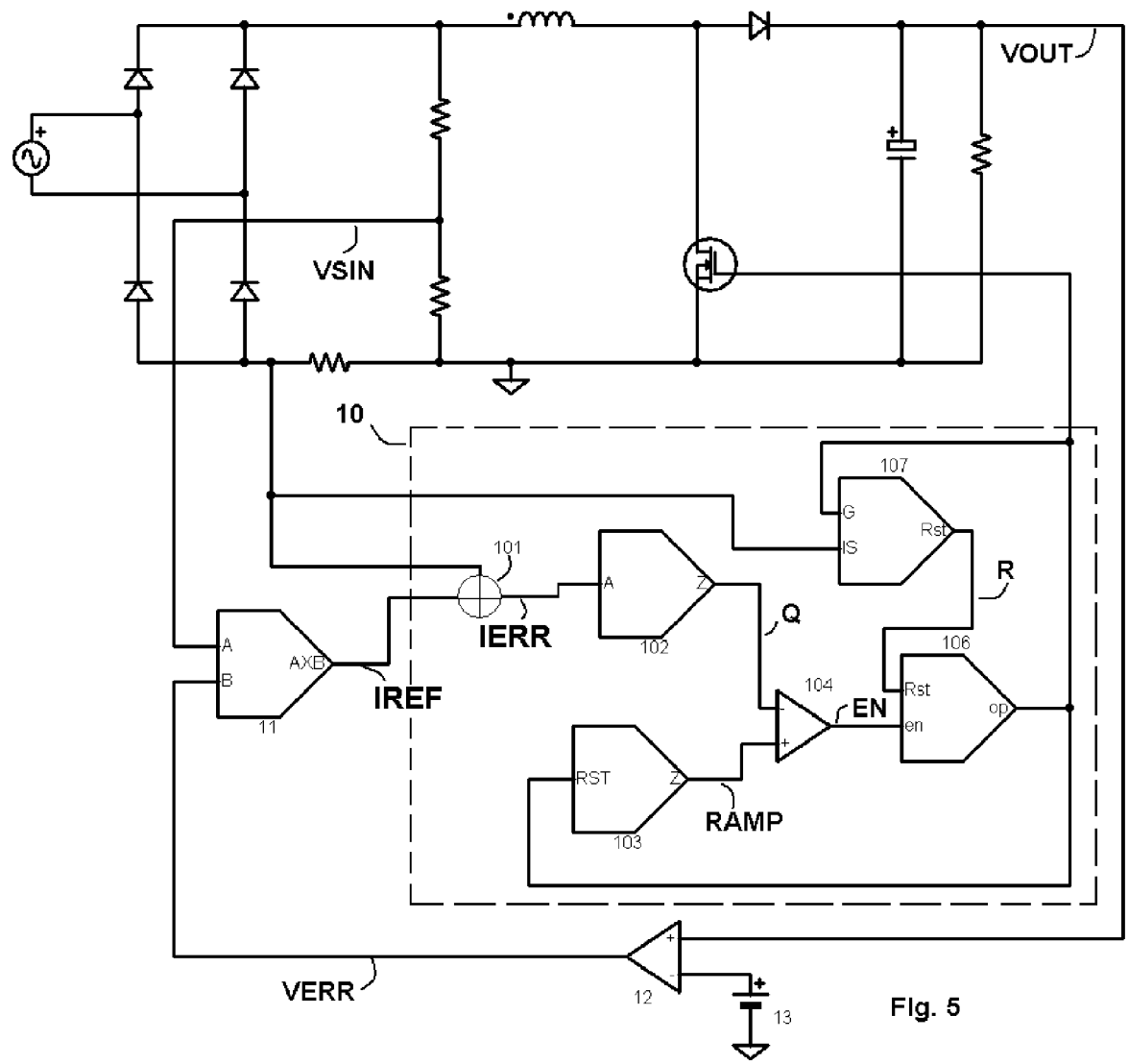
FIG. 5 illustrates an embodiment of the present invention enhanced with a current limiting function.

FIG. 5 illustrates an embodiment of the present invention with a current limiting feature. The pulse generator 106 has the same characteristics of the generator in FIG. 3 plus a reset input which will force the generator to go into pulse-off mode. The current limiting unit 107 has a leading edge blanking function such that current limiting function would not start until a short interval after the rising edge of the pulse G. This ensures the pulse G has a minimum width even if the sensed current is above the maximum allowed bound. If the sensed current, after a banking interval of the pulse G, is higher than a threshold level, a pulse R is output to reset the generator 106. The switch of the boost converter will be turned off instantly.

Figure 6A:
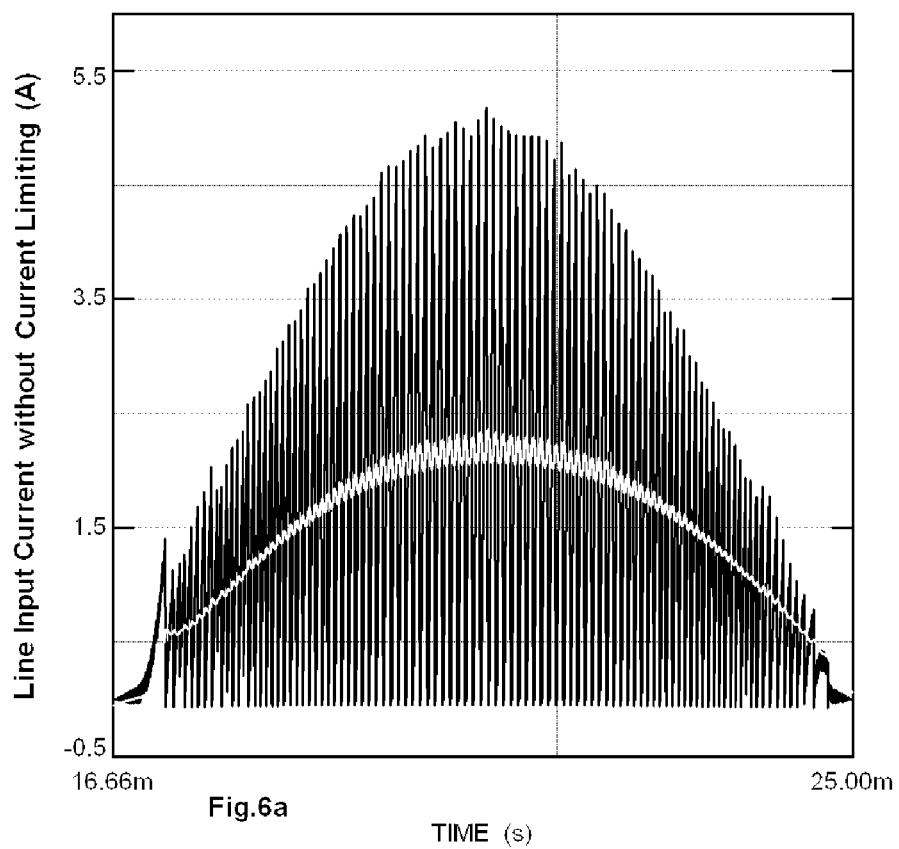
FIG. 6a illustrates line input current of the boost converter in FIG. 5 without the current limiting function.
Figure 6B:
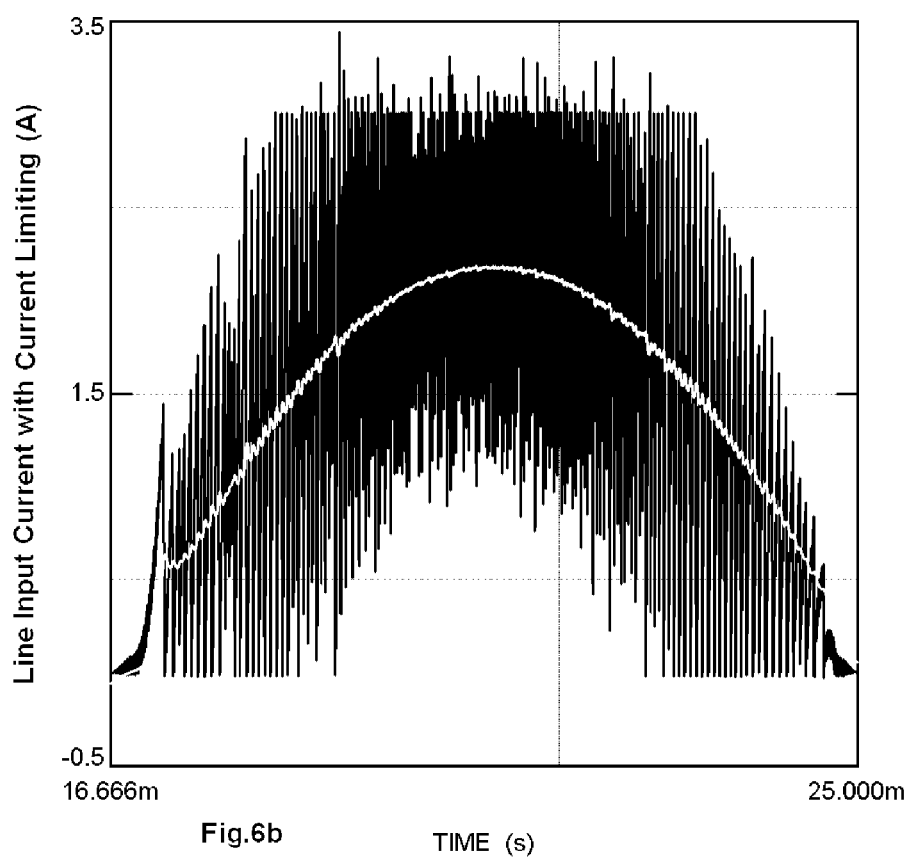
FIG. 6b illustrates line input current of the boost converter in FIG. 5 with the current limiting function activated.

FIG. 6a and FIG. 6b illustrates the line input currents of the boost converter in FIG. 5. The middle white lines are the averaged value. FIG. 6a is the case with the limit threshold set to a value much higher than the peak current. Effectively the current limiting function is disabled. FIG. 6b is the case with the threshold limit set to 3A. The peak of the current is bounded but the averaged current remains sinusoidal. In comparison with the case of FIG. 6a, one may see that the converter is working in continuous current mode. The ripple of the input current is smaller and is preferable in some applications.

Although the present invention has been described by way of exemplary embodiments on a boost converter, it should be understood that the present invention can be applied to other type of converters, e.g. forward, Cuk and similar. Changes and substitutions needed to use the present invention on other types of converters may be made by those skilled in the art without departing from the scope of the present invention which is defined by the appended claims.

What is claimed is:

1. A power factor correction control apparatus connected to a AC/DC converter to emulate a resistive load on the input power line wherein the converter provides a sense signal IFB which is proportional to the current drawn from the input power line and a sinusoidal signal IREF which is proportional to its loading and receive a switch signal G and the output power of the converter is proportional to the duty cycle of the switch signal, comprising:
   a summer, receiving the sense signal IFB for generating an error signal IERR in response to compare the said sense signal with the sinusoidal signal IREF from the converter;
   an averaging unit, coupled to the summer for averaging the signal IERR thereby yielding a signal Q;
   a ramp signal generator, starts generating a ramp signal RAMP when the switch signal G of the converter falls from high to low;
   a comparator, receiving the Q signal from the averaging unit and the RAMP signal from the ramp signal generator for generating a triggering signal EN in response to comparing the signal Q with the RAMP signal; and
   a pulse generator, coupled to the comparator for generating the said switch signal G of the converter when the triggering signal from the comparator rises from low to high.

2. A power factor correction control apparatus according to claim 1, wherein the said pulse generator generates a pulse with a fixed width when the triggering signal rises from low to high and remain off for a minimum interval.

3. A power factor correction control apparatus according to claim 2, wherein the said pulse generator generates a new pulse of fixed width when the triggering signal remain high at the end of the said minimum interval and remains off for a minimum interval again.

4. A power factor correction control apparatus according to claim 2, wherein the said pulse generator remains in off state when the triggering signal is low at the end of the said minimum interval.

5. A power factor correction control apparatus according to claim 2, wherein the said pulse generator has a reset input which reset the generator output to low when the reset input is high.

6. A power factor correction control apparatus according to claim 1, further comprising a comparator for limiting current, for comparing the said sense signal IFB from the converter with a threshold level wherein said comparator receiving the switch signal from the pulse generator starts the comparison after a short delay from the rising edge of the switch signal and outputting a reset signal R to the pulse generator when the signal IFB exceed the said threshold.

* * * * *